United States Patent [19]

Botta et al.

[11] 4,094,811

[45] June 13, 1978

[54] PROCESS FOR THE PREPARATION OF SILVER DISPERSIONS FOR FILTER LAYERS AND ANTIHALATION LAYERS

[75] Inventors: Artur Botta; Anita von König, both of Krefeld; Franz Moll, Leverkusen; Christian Rasp, Cologne; Johannes Hartl, Bechen, all of Germany

[73] Assignee: Agfa-Gevaert Aktiengesellschaft, Leverkusen-Bayerwerk, Germany

[21] Appl. No.: 753,093

[22] Filed: Dec. 21, 1976

[30] Foreign Application Priority Data

Dec. 30, 1975 Germany ............................ 2559191

[51] Int. Cl.[2] ......................... B01J 13/00; G03C 1/84

[52] U.S. Cl. ............................... 252/313 R; 96/84 R; 106/1.19; 252/300

[58] Field of Search ....................... 252/313 R, 300 R; 96/84 R; 106/1; 260/309.2

[56] References Cited

U.S. PATENT DOCUMENTS

| | | | |
|---|---|---|---|
| 2,688,601 | 9/1954 | Herz | 252/313 R |
| 3,655,412 | 4/1972 | Kumai et al. | 252/300 X |
| 3,674,703 | 7/1972 | Moll et al. | 252/313 R |
| 3,972,890 | 8/1976 | Botta | 260/309.2 X |

*Primary Examiner*—Richard D. Lovering

*Attorney, Agent, or Firm*—Connolly and Hutz

[57] ABSTRACT

The process for the preparation of silver dispersions for antihalation and filter layers in photographic material by reducing silver salts in the presence of a heterocyclic 5-membered or 6-membered compound which has a $$-N=C-\underset{|}{N}-$$

group in its 1,2,3-position and a 2-aminoalkyl or 2-hydroxyalkyl group or an alkylene chain which is linked through the 1- and 2-position. The process provides neutral grey silver dispersions without using cadmium salts, for the reduction of the silver salts.

10 Claims, 1 Drawing Figure

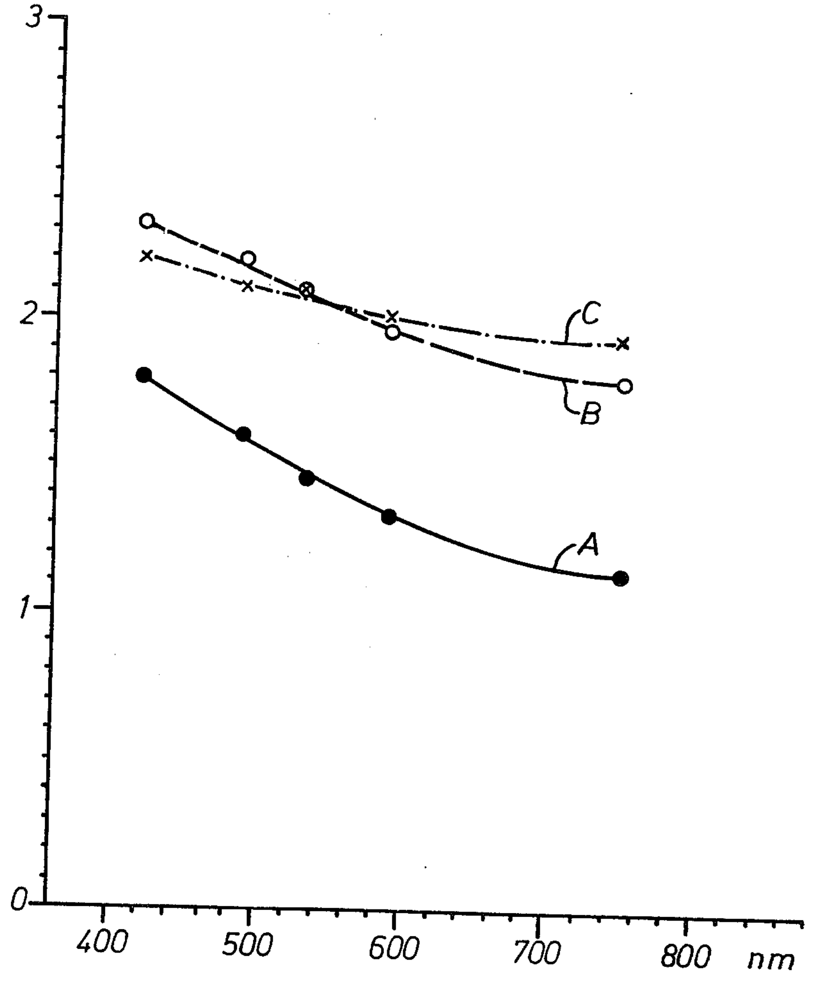
3
2
1
0
C
B
A
400
500
600
700
800
nm

PROCESS FOR THE PREPARATION OF SILVER DISPERSIONS FOR FILTER LAYERS AND ANTIHALATION LAYERS

This invention relates to a process for the preparation of silver dispersions for antihalation and filter layers.

Silver dispersions for filter layers and antihalation layers have hitherto been prepared mainly by the reduction of silver nitrate in the presence of a binder such as gelatine with phenols such as hydroquinone or tannin.

With these processes it is in most cases only possible to obtain blue silver dispersions which do not have a uniform absorption over the whole spectrum. Another serious disadvantage of these processes is that the resulting oxidation products of the reducing agent have a hardening effect on gelatine, even when only small quantities of oxidation products are left in the emulsion when the silver dispersion is being prepared.

When reduction is carried out with hydrazine, black silver dispersions are obtained only if silver nuclei are added to the gelatine solution. Moreover, vigorous foaming occurs due to the evolution of nitrogen. This foaming causes serious manufacturing problems when large quantities of silver dispersions are being prepared, and these problems are difficult if not impossible to overcome since antifoaming agents have a harmful effect when used in the preparation of photographic layers. The problems of gelatine hardening and of foam formation could be solved by the method described in German Offenlegungsschrift No. 1,917,745. According to this method, silver dispersions are prepared by the reduction of silver salts with ascorbic acid or its isomers, and either pure yellow or blue black silver dispersions can be obtained as desired, depending on the pH, the nature of the protective colloid used and other additives as well as the reducing agents, blue toners, etc..

Neutral grey silver dispersions which have a very uniform absorption over the whole spectrum and can be used for antihalation layers can be obtained by the reduction of silver salts with ascorbic acid in the presence of cadmium salts.

About 1 to 10% by weight of cadmium salts, based on the quantity of silver nitrate, are used for preparing the silver dispersions and, when preparing the dispersions, it is necessary to ensure that the dissolved cadmium salts are removed from the waste water. On the other hand, there is also a risk of the cadmium salts left in the dispersion being dissolved out of the photographic material when the exposed film is processed and thereby contaminating the waste water.

As part of the intensified efforts on the part of industry to restrict the use of potential environmental toxins, the possibility has been investigated of restricting the use of cadmium salts for the preparation of silver dispersions of antihalation layers without reducing the quality of the photographic materials produced.

The present invention is therefore based on the problem of developing a process for the preparation of neutral grey silver dispersions, which dispenses with the use of cadmium salts for the reduction of aqueous silver salts as reducing agents but still yields silver which is as far as possible neutral grey in colour and does not have any of the disadvantages of contaminated effluent mentioned above.

The invention thus relates to a process for the preparation of dispersions of metallic silver by reduction of an aqueous silver salt in the presence of a protective colloid and of a reducing agent of the kind commonly used for precipitating silver, such as phenols, hydrazine, compounds of the pyrazolidone-3 series, hydroxylamine or reducing sugar compounds such as dextrine or compounds of the oxytetronic acid series.

The process according to the invention is characterised in that reduction of the silver salt compound is carried out in the presence of a heterocyclic 5-membered or 6-membered compound which has a $$-N=\underset{|}{C}-N-$$

group in its 1,2,3-position and a 2-aminoalkyl or 2-hydroxyalkyl group or an alkylene chain which is linked through the 1- and 2-position.

The reducing agent used is preferably an oxytetronic acid compound such as ascorbic acid or its isomers or homologues which may be partly replaced by other conventional reducing agents but preferably not to a greater extent than 50%. The following are suitable examples: Hydrazine hydrate, hydroxylamine, compounds of the pyrazolidone-3 series and adduct compounds of amines with boranes or dextrin.

The process according to the invention gives rise to silver dispersions which have an excellent neutral grey colour with high covering power without having any deleterious effect on the effluent. Furthermore, the above mentioned heterocyclic compound used according to the invention is photographically completely inert so that it has no deleterious effect on photographic materials if the silver dispersions prepared according to the invention are used as antihalation layers in photographic materials.

The process according to the invention is preferably carried out in the presence of a protective colloid which contains polyvinyl pyrrolidone as additive.

The quantity of polyvinyl pyrrolidone to be used may vary within wide limits and depends mainly on the nature of the reducing agent used and of the heterocyclic compound. It has generally been found suitable to add from 0.5 to 50 g of polyvinyl pyrrolidone per mol of silver nitrate, preferably from 2 to 10 g/mol of silver nitrate.

The protective colloids used for the process according to the invention may be hydrophilic, water-soluble film formers, e.g. natural polymers such as starch or degradation products of starch such as dextrans or dextrins, or proteins, preferably gelatine. Suitable synthetic film formers include polyvinyl alcohol, partially saponified polyvinyl acetate and polyvinyl pyrrolidone, which has already been mentioned above.

The reducing agents used for the process according to the invention are preferably oxytetronic acid compounds. According to "Chemie der Zucker- und Polysaccharide," by F. Micheel, 2nd Edition, published by akademische Verlagsanstalt Geest und Portig KG, 1956, pages 35 to 39, oxytetronic acid compounds are sugar compounds with reducing properties.

L-Ascorbic acid, which is the most frequently occurring among the reducing sugar compounds which may be used according to the invention should therefore be regarded as L-threo-oxytetronic acid. Other suitable reducing agents include isoascorbic acid, (D-erythro-oxytetronic acid); 6-desoxi-L-ascorbic acid, (6-desoxi-L-threo-oxytetronic acids) and 4-methyl-D, L-oxytetronic acid.

The heterocyclic compounds used for the process according to the invention may be 5-membered or 6-membered compounds and may contain condensed aromatic rings, in particular a condensed benzene ring which may be substituted. The compounds used according to the invention may also be used in the form of their quaternary salts after reaction with a suitable alkylating agent.

Particularly suitable among the heterocyclic compounds which may be used according to the invention are those represented by the following general formula

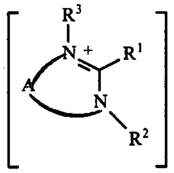

in which $R^1$ represents a straight or branched chain alkyl group which may be substituted with a hydroxyl or amino group and preferably has from 1 to 11 carbon atoms, such as a straight or branched chain methyl, ethyl, propyl, butyl, pentyl or undecyl group. The amino group may be substituted with lower alkyl groups, preferably with alkyl groups having up to 4 carbon atoms such as methyl or propyl; aryl, in particular phenyl; aralkyl, in particular phenethyl or benzyl; or with an acyl group derived from an aromatic or aliphatic short chain carboxylic acid having up to 5 carbon atoms such as acetic acid, propionic acid, butyric acid or isobutyric acid or from aromatic carboxylic acids such as benzoic acid or toluic acid. Alkyl groups which are substituted by the hydroxyl or amino group selectively on the 3rd to 8th carbon atom from the point of attachment are preferred.

$R^2$ represents hydrogen; an alkyl group preferably having from 1 to 6 carbon atoms such as methyl, isopropyl or pentyl; a cycloalkyl group such as cyclopentyl or cyclohexyl; an aralkyl group such as phenethyl or benzyl; or an aryl group, in particular a phenyl group or $R^1$ and $R^2$ together represent an alkylene chain which may be substituted by shorter alkyl groups having up to 6 carbon atoms such as methyl, isopropyl or pentyl or cycloalkyl such as cyclopentyl or cyclohexyl or aryl such as phenyl and which is capable of forming a 5-membered to 7-membered heterocyclic ring together with the nitrogen atom in the 1-position and the carbon atom in the 2-position of the heterocyclic ring;

$R^3$ represents a free electron pair; a hydrogen atom or a substituent suitable for forming a quaternary salt, such as an alkyl group, in particular an alkyl having from 1 to 6 carbon atoms such as methyl, isopropyl or butyl; aryl, in particular phenyl, or aralkyl, in particular benzyl;

X represents an anion required to complete a quaternary salt or an ammonium salt, which anion is photographically inert and normally used for completing quaternary salts and ammonium salts in photographic materials, for example anions of inorganic acids such as halides, in particular chlorides, or sulphates, or anions of organic acids, such as tosylate or mesylate; X is absent when $R^3$ represents an electron pair; and A represents the carbon atoms required to complete a 5-membered or 6-membered ring, such as the carbon atoms required to complete an imidazole, imidazoline, dihydropyrimidine or tetrahydropyrimidine ring, and the heterocyclic ring may also carry condensed aromatic rings, e.g. a benzo or naphtho ring, for example benzimidazole, perimidine or dihydroquinazoline which condensed rings may in turn be substituted, for example by an alkyl group having up to 6 carbon atoms such as a methyl, isopropyl or tert-butyl group, a cycloalkyl group such as a cyclopentyl or cyclohexyl group, an aralkyl group such as a benzyl group, an aryl group such as a phenyl group or halogen such as chlorine.

The following are examples of suitable heterocyclic compounds which may be used according to the invention:

Table 1

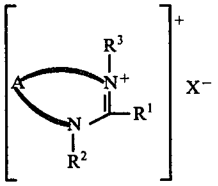

| No. | 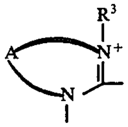 | $R^1$ | $R^2$ | $X^-$ | °C |
|---|---|---|---|---|---|
| 1 | Benzimidazole | $-[CH_2]_3-NH_2$ | H | — | mp: 119-120° |
| 2 | Benzimidazole | $-[CH_2]_4-NH_2$ | H | — | mp: 70° |
| 3 | Benzimidazole | $-[CH_2]_5-NH_2$ | H | — | mp: 99° |
| 4 | Benzimidazole | $-[CH_2]_{11}-NH_2$ | H | — | mp: 73,5-74,5° |
| 5 | Benzimidazole | $-[CH_2]_3-NH-CH_3$ | H | — | mp: 137,5° |
| 6 | 5-Methylbenzimidazole | $-[CH_2]_3-NH-CH_3$ | H | — | mp: 126° |
| 7 | Benzimidazole | $-[CH_2]_5-NH-CH_3$ | H | — | $bp_{0,3}$: 195-205° |
| 8 | Benzimidazole | $-[CH_2]_5-NH_2$ | $C_6H_5$ | — | $bp_{0,3}$: 185° |
| 9 | Benzimidazole | $-[CH_2]_5-NH-CH_2-C_6H_6$ | H | — | $bp_{0,1}$: 239-240° |
| 10 | Benzimidazole | $-[CH_2]_5-NH-CO-C_6H_5$ | H | — | mp: 201-202° |
| 11 | Benzimidazole | $-CH_2-CH_2-CH_2-CH_2-CH_2-$ | | — | mp: 126° |
| 12 | Benzimidazolinium | $-CH_2-CH_2-CH_2-CH_2-CH_2-$ | | $Cl^-$ | mp: 226-228° |
| 13 | Benzimidazole | $-CH_2-CH_2-CH_2-CH_2-$ | | — | mp: 106° |

Table 1-continued

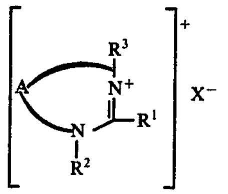

| No. | 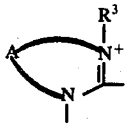 | $R^1$ | $R^2$ | $X^-$ | °C |
|---|---|---|---|---|---|
| 14 | Benzimidazole | $-CH_2-CH_2-CH_2-$ | | — | mp: 114° |
| 15 | 3-Methylbenzimidazolinium | $-CH_2-CH_2-CH_2-CH_2-CH_2-$ | | Tosylate | mp: 171° |
| 16 | Benzimidazole | $-[CH_2]_3-OH$ | H | — | mp: 163° |
| 17 | Benzimidazole | $-[CH_2]_5-OH$ | H | — | mp: 143° |
| 18 | 5-Methylbenzimidazol | $-[CH_2]_5-OH$ | H | — | mp: 134° |
| 19 | Benzimidazole | $-CH_2-CH_2-CH(OH)-CH_3$ | H | — | mp: 123° |
| 20 | 4,6-Dimethylbenzimidazole | $-[CH_2]_3-OH$ | H | — | mp: 169° |
| 21 | 3,4,5,6-Tetrahydropyrimidine | $-[CH_2]_4-NH_2$ | H | — | $bp_{10}$: 158° |
| 22 | 3,4,5,6-Tetrahydropyrimidine | $-[CH_2]_5-NH_2$ | H | — | $bp_{0.05}$: 137° |
| 23 | 3,4,5,6-Tetrahydropyrimidine | $-CH_2]_5-NH_2$ | $-[CH_2]_3-NH_2$ | — | $bp_{0,2}$: 155–60° |
| 24 | Perimidine | $-[CH_2]_5-NH_2$ | H | — | mp: 193° |
| 25 | 7-Chlorobenzimidazole | $-CH_2-CH_2-CH_2-CH_2-CH_2-$ | | — | mp: 115° |
| 26 | 4-Chlorbenzimidazole | $-CH_2-CH_2-CH_2-CH_2-CH_2-$ | | — | mp: 136° |
| 27 | 2-Imidazoline | $-[C_2]_5-NH_2$ | H | — | mp: 78–81° |
| 28 | 5-Methyl-2-imidazoline | $-[CH_2]_5-NH_2$ | H | — | $bp_{0,05}$: 116–120° |
| 29 | 2-Imidazoline | $-[CH_2]_{11}-NH_2$ | H | — | mp: 96–97° |
| 30 | 3,4,5,6-Tetrahydropyrimidine | $-CH_2-CH_2-CH_2-$ | | — | $bp_{11}$: 97–99° |
| 31 | 3,4,5,6-Tetrahydropyrimidine | $-CH_2-CH_2-CH_2-CH_2-CH_2-$ | | — | $bp_{13}$: 130° |
| 32 | Benzimidazole | $-CH_2-C(CH_3)_2-NH_2$ | H | — | mp: 210° |
| 33 | Benzimidazole | $-CH_2-CH_2-CH(C_4H_9\text{-tert.})-CH_2-CH_2-NH_2$ | H | — | $bp_{0,05}$: 215–18° |
| 34 | Benzimidazole | $-[CH_2]_5-N(CH_3)_2$ | H | — | $bp_{0,05}$: 197° |
| 35 | Benzimidazole | $-CH_2-CH_2-CH(C_4H_9\text{-tert.})-CH_2-CH_2-$ | | — | mp: 143° |
| 36 | 3,4,5,6-Tetrahydropyrimidine | $-[CH_2]_5-NH_2$ | $CH_3$ | — | $Bp_{15}$: 168–170° |
| 37 | 3,4,5,6-Tetrahydropyrimidine | $-[CH_2]_6-NH_2$ | H | — | $Bp_{10}$: 188° |
| 38 | Imidazoline | $-[CH_2]_5-NH_2$ | $-[CH_2]_2-NH_2$ | — | $Bp_{0,1}$: 128–30° |
| 39 | Imidazoline | $-[CH_2]_4-NH_2$ | H | — | $Bp_{12}$: 155°⁻ |
| 40 | Imidazoline | $-[CH_2]_6-NH_2$ | H | — | $Bp_{10}$: 175° |
| 41 | Imidazoline | $-CH_2-CH_2-CH_2-CH_2-$ | | — | $Bp_{0,03}$: 42–44° |
| 42 | Benzimidazole | Dihydrochloride of compound No. 3 | | | mp: 240°–250° |
| 43 | Benzimidazole | Dinitrate of compound No. 3 | | | mp: 145°–146° |

*In the compounds mentioned in the above Table, $X^-$ and + are absent when $R^3$ is a free electron pair.

The following are further examples of suitable benzimidazole derivatives of the process according to the invention:

2-(γ-Isobutylaminobutyl)-; 2-(ε-acetylaminopentyl)-; 2-(ε-dimethylaminopentyl)-; 2-(aminohexyl)-; 2-(ω-amino-heptyl); 2-(δ-hydroxybutyl)-; 2-[2'-(2''-hydroxycyclohexyl)-ethyl]-; 2-(δ-hydroxypentyl)-; 2-(ω-hydroxyheptyl)-; 2-(ε-hydroxypropyl)- 1-methyl; 2-(ω-hydroxybutyl-1-ethyl)-; 2-(ε-hydroxypentyl)-1-phenyl; 2-(γ-aminobutyl)-1-ethyl-; 1,2-(1'-methyltrimethylene)-; 1,2-(2'ethyltrimethylene)-; 1,2-(3'-methyltrimethylene)-; 1,2(1'-benzyltrimethylene)-; 1,2-tetramethylene-;

1,2-(3-phenyltetramethylene)-; 1,2-(3'-isopropyl-4'-methyltetramethylene)-; 1,2-pentamethylene; 1,2-(3'-tert.-butylpentamethylene)-; 1,2-(5'-cyclohexyl-pentamethylene)-benzimidazole, its 4-, 5-, 6- or 7-methyl compound, its 5-trifluoromethyl, 5-tert.-butyl or 5-phenyl compound, its 4,6- or 5,7-dimethyl compound; its 4-, 5-, 6- or 7-chloro or bromo compound or its 5,6-dichloro compound.

As already mentioned above, the compounds used according to the invention may be put into the process in the form of their bases or their salts and it is left open which nitrogen atom of the given compound is used for salt formation.

The quantity of heterocyclic compound to be used may vary within wide limits and depends on the nature of the reducing agent and the quantity of polyvinyl pyrrolidone added. It can easily be determined by a few laboratory tests. It has generally been found sufficient to add from 5 to 500 mg and preferable to add from 20 to 100 mg per mol of silver salt.

The heterocyclic compounds used according to the invention may be prepared by known methods.

2-(ω-Aminoalkyl)-benzimidazoles, for example, may be prepared by reacting phenylene diamines with amino acids or amino acid derivatives as described in Chem.

Reviews 74, 279 to 283 (1974); German Pat. No. 1,131,688 and British Pat. No. 1,023,792 or with reactive lactime derivatives as described in German Offenlegungsschrift No. 2,110,227 or with lactams as described in German Offenlegungsschrift No. 2,321,054.

2-(ω-Hydroxyalkyl)-benzimidazoles, for example, may be prepared by reacting phenylene diamines with lactones as described in Ann. 596, 208 (1955); Khim. Geterotsikl, Soedin. (1972), pages 641 to 644; J. Org. Chem. 24, 419 to 421 (1959) and Z. Naturforsch. 25B, 928 to 931 (1970) or with N,N',N"-tris-(ω-hydroxyalkyl)-triazines as described in Bull. Chem. Soc. Japan 38, 897 to 901 (1965).

Finally, 1,2-alkylene-benzimidazoles can be prepared, for example, by acid catalysed thermal splitting of 2-(ω-aminoalkyl)-benzimidazoles as described in German Patent Application P 24 35 406.1, by ring opening condensation of phenylene diamines with lactones as described in Ann. 596, 209 (1955); J. Org. Chem. 24, 419 to 421 (1959) and Z. Naturforsch. 25B, 928 to 931 (1970) or by ring closing condensation of o-phenylene diamines with ω-halogencarboxylic acid iminoether hydrochlorides as described in J. Org. Chem. 27, 2165 (1962). The preparation of 1,2-alkylene imidazolines has been described in J. prakt. Ch. [2] 140, 59 [1934] and the preparation of 1,2-alkylene-3,4,5,6-tetrahydropyrimidines has been described in Synthesis 11, 591 [1972].

The salts of the basic compounds according to the invention with photographically inert acids are prepared by the usual methods. Quaternary salts of 1,2-alkylene benzimidazoles are prepared by quaternisation with suitable alkylation agents such as alkyl or aralkyl halides, tosylates, sulphates or mesylates.

The preparation of compound 11 is described below by way of example.

5 g of methanesulphonic acid are added to 200 g (1 mol) of 2-(5'-aminopentyl)-benzimidazole and the mixture is heated to 300° C for one hour with stirring and kept at 300° to 320° C for about 10 to 15 hours until evolution of ammonia ceases. Subsequent fractional distillation of the reaction mixture yields 159 g (85.4% of the theory) of 1,2-pentamethylene-benzimidazole, b.p.$_{0.05\,mm}$ 145° to 148° C, m.p. 126° C, colourless crystals after recrystallisation from 3 parts of ethyl acetate.

As already mentioned above, part of the reducing agent used in the process according to the invention, preferably up to 50 mol percent, may consist e.g. of hydrazine hydrate, hydroxylamine, compounds of the pyrazolidone-3 series such as 1-phenylpyrazolidone-3, addition products of amines and boranes, or dextrin. When reducing agents which liberate gases are also used, they should be added in such small quantities that unwanted foaming will not occur and any reducing agents which have a hardening effect should also be used in such small quantities that they have no deleterious effect.

After reduction, the silver dispersions are adjusted to a pH of between 5.5 and 6.5 and when they have solidified they are shredded and rinsed. If desired, rinsing may be replaced by a process of flocculating, for example using ammonium sulphate or any of the usual flocculating agents.

When the soluble salts have been washed out, the shreds are melted and if necessary a further portion of protective colloid is added, e.g. gelatine.

EXAMPLE 1

(A) Comparison Example I

Preparation of a silver dispersion using an ascorbic acid solution 50 ml of a 7 percent by weight aqueous gelatine solution (salt free bone gelatine) were mixed with 64 ml of a 30% aqueous ascorbic acid solution. The pH of the solution was about 1.2. 34 ml of a 50% silver nitrate solution were added to this mixture at 30° C with vigorous stirring. The silver nitrate was thereby reduced and a dark brown silver dispersion was obtained.

When solid, this silver dispersion was shredded and rinsed. After rinsing, the dispersion was melted and 5 g of gelatine were added to the melt. After the gelatine had been dissolved at 40° C, 4 ml of a 2.5% methanolic solution of phenol were added to the melt as bactericide and 2 ml of a 7.5% aqueous solution of saponin were added as wetting agent and the melt was applied to a transparent cellulose acetate substrate. The dark brown material obtained in this way was examined behind various filters of a Zeiss filter photometer and the colour densities determined at the wavelengths indicated below. To calculate the covering power, the colour densities were divided by the quantity of silver applied, calculated as silver nitrate. The values obtained for the covering power at different wavelengths are given below:

Table 2

| Wavelength [nm] | 420 | 490 | 530 | 590 | 750 |
|---|---|---|---|---|---|
| Covering power | 1.8 | 1.6 | 1.5 | 1.35 | 1.15 |

(B) Comparison Example II

Preparation of a silver dispersion according to Comparison Example I using cadmium chloride additionally.

A silver dispersion was prepared in the same way as described in Comparison Example I except that 20 ml of a 10% cadmium chloride solution were added to the gelatine solution before the silver nitrate solution was run in. Subsequent treatment and determination of the covering powers were carried out as described in Comparison Example I.

Table 3

| Wavelength [nm] | 420 | 490 | 530 | 590 | 750 |
|---|---|---|---|---|---|
| Covering power | 2.3 | 2.2 | 2.1 | 1.95 | 1.8 |

Comparison Example II shows that when cadmium salts are used, neutral grey silver dispersions are obtained which have a practically uniform covering power over the whole wavelength range of the spectrum.

(C) Example according to the invention

This is a repetition of comparison Example 1 except that, before the addition of silver nitrate solution, 500 mg of a polyvinyl pyrrolidone (e.g. polyvinyl pyrrolidone K 90 having a molecular weight of 90,000 manufactured by BASF, Ludwigschafen) and 7 ml of a 0.1% solution of 1,2-pentamethylene benzimidazole hydrochloride were added. Subsequent treatment of the material and determination of the covering powers were carried out as described in Comparison Example I.

Table 4

| Wavelength [nm] | 420 | 490 | 530 | 590 | 750 |
|---|---|---|---|---|---|
| Covering power | 2.2 | 2.1 | 2.1 | 2.0 | 1.95 |

When the values for covering power obtained according to the invention are compared with the corresponding values in the comparison examples, it is found that by adding the substances used according to the invention it is possible to prepare a neutral gray silver dispersion with high covering power which compares favourably with the neutral grey silver dispersion obtained according to Comparison Example II in being even more uniform over the whole spectral range.

This is shown graphically in the accompanying FIGURE where the relationship between covering power and wavelength in Comparison Example I is represented as the full line curve A, that of Comparison Example II as broken line curve B and that of the Example according to the invention as dash-dot curve C. In the graph, the values for covering power are plotted along the ordinate and the wavelengths in nm along the abscissa.

EXAMPLE 2

Example 1C was repeated, except that instead of 1,2-pentamethylene-benzimidazole hydrochloride used in Example 1C, the compounds shown in Table 5 below were used in the quantities indicated.

Table 5

| Compound No. | Quantity mg/mol silver nitrate | Covering power at wavelengths [nm] 420 | 490 | 530 | 590 | 750 |
|---|---|---|---|---|---|---|
| 1 | 90 | 2.2 | 2.2 | 2.1 | 2.1 | 1.95 |
| 3 | 100 | 2.3 | 2.0 | 1.95 | 1.9 | 1.8 |
| 9 | 80 | 2.0 | 2.0 | 2.0 | 1.95 | 1.9 |
| 14 | 100 | 2.3 | 2.1 | 1.95 | 1.85 | 1.8 |
| 13 | 80 | 2.1 | 2.1 | 2.1 | 2.0 | 2.0 |
| 16 | 90 | 2.2 | 2.0 | 1.85 | 1.90 | 1.85 |
| 19 | 90 | 2.2 | 2.0 | 1.85 | 1.90 | 1.85 |

The covering power can be determined within the limits of error of ±5 %.

EXAMPLE 3

Example 1C was repeated except that instead of using the quantity of reducing agent indicated in Example 1C, 48 ml of a 30% ascorbic acid solution and 5 ml of a 10% hydrazine hydrate solution were added and the quantity of 1,2-pentamethylene benzimidazole hydrochloride was increased to 9 ml of the 0.1% solution.

The following results were obtained:

Table 6

| Wavelength [nm] | 420 | 490 | 530 | 590 | 750 |
|---|---|---|---|---|---|
| Covering power | 2.3 | 2.2 | 2.0 | 2.0 | 1.85 |

We claim:

1. A process of preparing a neutral grey dispersion of silver in a protective colloid which comprises the step of reducing with a silver salt reducing agent, silver nitrate in an aqueous solution in a mixture with an aqueous solution of a protective colloid without using cadmium salt and in the presence of an agent for providing the reduced silver in a neutral grey dispersion having a uniform absorption over the spectrum of visible light, wherein the agent for providing the uniform dispersion consists essentially from about 5 mg to about 500 mg per mol of silver salt of a heterocyclic 5-membered or 6-membered compound containing an

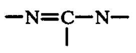

group in its 1,2,3-position and having in its 2-position an amino alkyl or hydroxy alkyl group or an alkylene chain attached too to the N atom in 1-position thus forming an anellated ring.

2. Process according to claim 1 wherein the silver salt reducing agent is a compound of the oxytetronic acid series.

3. Process according to claim 2, characterised in that the oxytetronic acid used is ascorbic acid or one of its isomeric compounds and that hydrazine, hydroxylamine or salts thereof, compounds of the 3-pyrazolidone series or dextrin are used in addition to ascorbic acid or its isomers.

4. Process according to claim 1 wherein the protective colloid contains polyvinyl pyrrolidone as additive.

5. Process according to claim 1 wherein the heterocyclic compound is a compound of the following formula

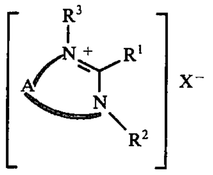

wherein $R^1$ represents a straight or branched chain alkyl group having from 1 to 11 carbon atoms and substituted with an amino or hydroxyl group, which amino group may be substituted by short chain alkyl groups or by aryl, aralkyl or acyl;

$R^2$ represents hydrogen, alkyl with 1 to 6 carbon atoms, cycloalkyl, aralkyl or aryl or $R^1$ and $R^2$ represent the alkylene chain required for forming a 5-membered to 7-membered ring, which alkylene chain may be substituted by alkyl, cycloalkyl or aryl;

$R^3$ represents a free electron pair, a hydrogen atom or an alkyl, aralkyl or aryl group;

X represents a photographically inert anion suitable for completing an ammonium salt or quaternary salt and is absent when $R^3$ is a free electron pair; and A represents the carbon atoms required for completing a 5-membered or 6-membered ring, which carbon atoms may carry condensed aromatic rings.

6. Process according to claim 5, characterised in that $R^2$ denotes hydrogen, methyl, benzyl or phenyl and X denotes chloride, sulphate, mesylate or tosylate if $R^3$ represents hydrogen, an alkyl with 1 to 5 carbon atoms, phenyl or benzyl.

7. Process according to claim 5, characterised in that $R^1$ and $R^2$ together represent a trimethylene, tetramethylene or pentamethylene group.

8. Process according to claim 5, characterised in that A represents the atoms required for completing an optionally substituted imidazole, imidazoline, dihydropyrimidine or tetrahydropyrimidine ring.

9. Process according to claim 5, characterised in that A represents the atoms required for completing a benzimidazole, perimidine or dihydroquinazoline ring, which ring may be substituted by alkyl, cycloalkyl, aryl, aralkyl or halogen.

10. Process according to claim 1 wherein the protective colloid is gelatin.

* * * * *

UNITED STATES PATENT AND TRADEMARK OFFICE
CERTIFICATE OF CORRECTION

PATENT NO. : 4,094,811

DATED : June 13, 1978

INVENTOR(S) : Artur Botta et al.

It is certified that error appears in the above-identified patent and that said Letters Patent are hereby corrected as shown below:

In Table I: In Compound 9, the substituent $R^1$ should read:

-- $-(CH_2)_5-NH-CH_2-C_6H_5$ --

In Compound 27 $R^1$ should read -- $-(CH_2)_5-NH_2$ --

Compounds 36-41, "Bp" should read -- bp --

In column 5, line 55, "amino-heptyl" should read -- amino-heptyl )- --;

line 57, "2-( ξ -hydroxy-propyl)-1-" should read

-- 2-( δ -hydroxypropyl)-1- --.

In column 5, line 61, "1,2(1'-ben-" should read -- 1,2-(1'ben- --;

line 63, "1,2-(3-phenyltetramethylene)-" should read

-- 1,2-(3'-phenyltetramethylene)- --.

Signed and Sealed this

*Twenty-sixth* Day of *June 1979*

[SEAL]

*Attest:*

RUTH C. MASON
*Attesting Officer*

DONALD W. BANNER
*Commissioner of Patents and Trademarks*